United States Patent
Dee

[11] 3,768,879
[45] Oct. 30, 1973

[54] SPHERICAL BEARING

[75] Inventor: Colin William Dee, Dorset, England

[73] Assignee: The HorstMann Gear Company Limited, Bath, England

[22] Filed: Feb. 28, 1972

[21] Appl. No.: 230,010

[30] Foreign Application Priority Data
Feb. 2, 1971   Great Britain ..................... 5,783/71

[52] U.S. Cl. ............................................. 308/9
[51] Int. Cl. .......................................... F16c 17/16
[58] Field of Search ............................. 308/9, 122

[56] References Cited
UNITED STATES PATENTS
3,368,850   2/1968   Wilcox ................................. 308/9
3,533,664   10/1970   Dee ..................................... 308/9

Primary Examiner—Charles J. Myhre
Assistant Examiner—Frank Susko
Attorney—William Anthony Drucker

[57] ABSTRACT

The invention provides a fluid bearing in which part-spherical bearing surfaces define a bearing gap. Fluid is fed under pressure to the bearing gap through either a full circumferential slot, or a plurality of discrete slots arranged in a circumferential row. By selection of inter alia a certain range of angles, at which the slot or slots are positioned, in relation to the angles subtended by the axial ends of the bearing gap, the performance of the bearing becomes substantially independent of physical characteristics of the fluid and load capacity is determined substantially by bearing geometry and the pressure of the applied fluid.

7 Claims, 9 Drawing Figures

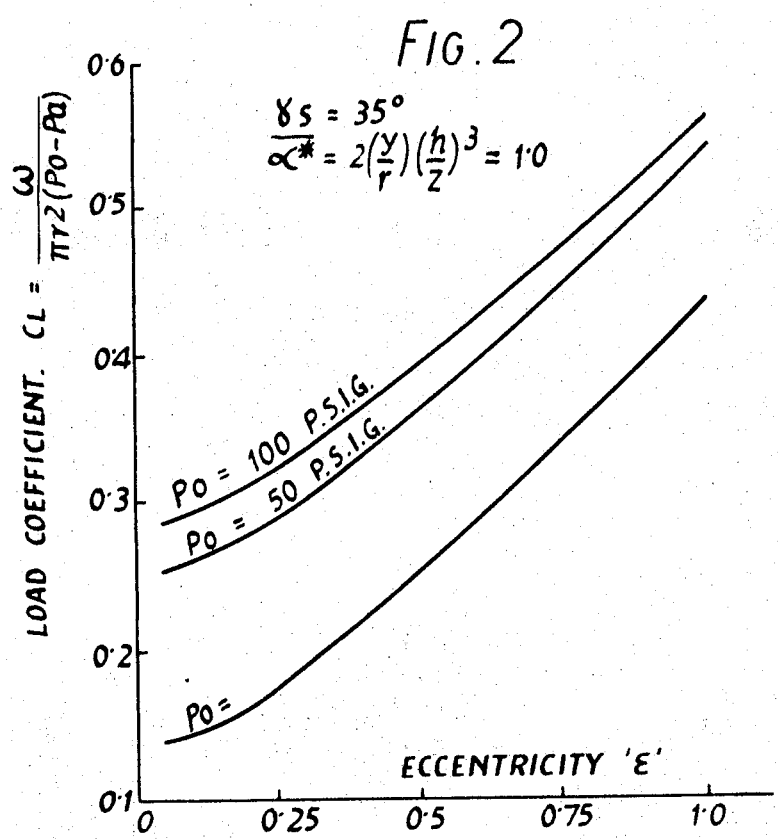

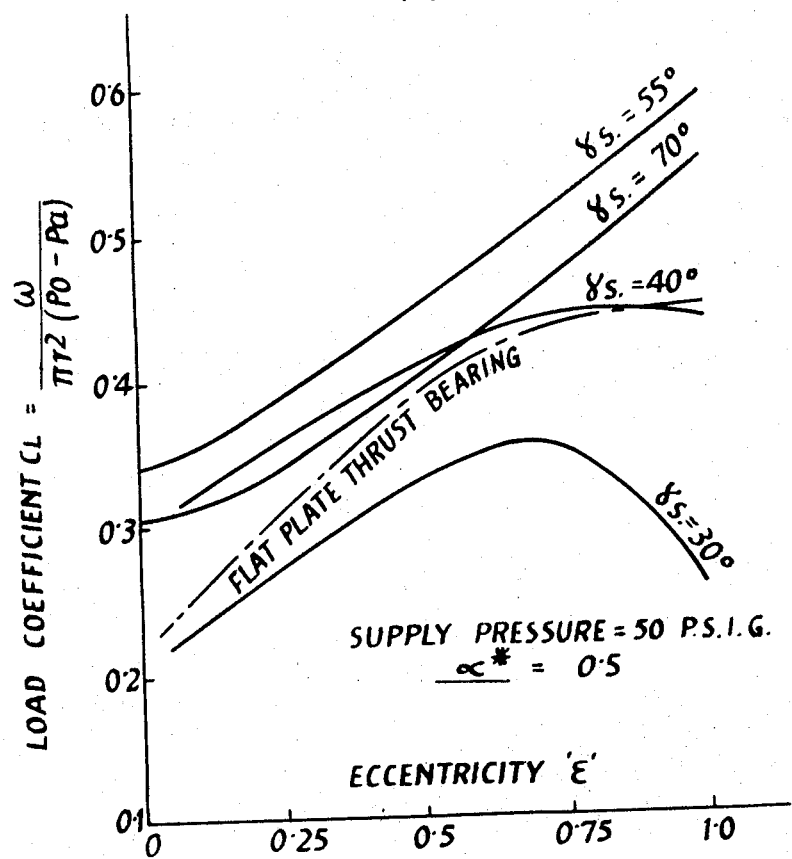

SPHERICAL BEARING

This invention relates to fluid bearings.

It is known that by using discrete slots for the feeding of fluid to the bearing gap of a journal bearing, it is possible to make the bearing operate at near optimum load capacity and stiffness conditions, substantially independent of the visosity and density of the fluid, and thus able to operate on gases, vapour or liquids, without change of design, if the value of $\alpha$ in the following formulae is made to lie between 1 and 8 inclusive, and preferably between 2 and 6 inclusive:

$\alpha = (2y/l) \cdot (h/z)^3$ for a double row of entry slots
$\alpha = (y/l) \cdot (h/z)^3$ for a single row of entry slots where
  $y$ = the radial length of the slot
  $l$ = the axial distance from slot exit to end of bearing
  $z$ = the axial depth of the slot
and $h_o$ = the bearing radial clearance at zero eccentricity, (see FIG. 1 herein). The length to diameter ratio (L/D) should be equal to or less than unity, in order not to incur a significant reduction in specific load capacity (i.e., load per unit projected area) associated with circumferential flow effects.

This is contrary to orifice-fed bearing construction, as known in the present state of the art, where the need is to conform to L/D ratios in excess of unity in order to attenuate loss effects due to orifice dispersion, (that is, the expansion of the gas into the bearing area from the orifice exit) thereby increasing the adverse effects of circumferential flow. With the presence of both dispersion and circumferential flow problems, the load carrying capacity and the stiffness of unpocketed orifice type bearings can be low.

However, the bearing design with a row of discrete slots, which in its limiting case becomes a full circumferential slot, results in a comparable flow condition within both feed slot and bearing clearance equally, such that optimum load capacity and stiffness conditions are obtained substantially independent of whether the fluid is a gas, vapour or liquid.

For a bearing to have equal properties in all radial directions, the discrete slots should be uniformly similar to one another and angularly equispaced. The radial length of the slot should preferably be a small fraction of the bearing diameter.

As the slot type bearing can have low L/D ratios, it lends itself to simple modular construction with consequent ease of manufacture. The bearing performs within the simple formula as under:

Load $W = C_L \cdot L \cdot D (P_o - P_a)$
Stiffness $= dW/dh = C_S \, LD/h_o (P_o - P_a)$
Bearing consumption $Q = C_F (h_o)^3 K_F f(P)$

DEFINITIONS

| Symbol | DESCRIPTION |
|---|---|
| $C_F$ | flow coefficient |
| $C_L$ | load coefficient |
| $C_S$ | stiffness coefficient |
| D | bearing journal diameter |
| $h_o$ | bearing clearance at zero eccentricity (journal) |
| $K_F$ | fluid flow constant |
| L | bearing length |
| Pa | bearing exhaust pressure |
| Po | bearing supply pressure |
| Q | volumetric fluid flow |

Although the short journal bearing construction will absorb a certain degree of misalignment, greater than that of the necessarily longer design of orifice bearing, there are many occasions where it is desirable and often necessary to absorb a considerable degree of misalignment.

The object of the present invention is to provide improvements, relating to spherical and part-spherical fluid bearings, the nature of which will be apparent from the following description.

According to the present invention in a fluid bearing which comprises a first outer bearing member having a part-spherical inner bearing surface, a second inner bearing member having a part-spherical outer bearing surface, said inner and outer bearing surfaces together defining a bearing volume, one of said bearing members including at least one full circumferential slot or circumferential row of discrete parallel-sided fluid entry slots opening into the bearing volume, said discrete slots having their longer cross-sectional dimension disposed circumferentially and the sum of the longer cross-sectional dimension of all of the discrete slots being at least 80% of the circumference on which they lie, the angle $\gamma_s$ (as defined below) is not less that $\beta_1 + (\beta_2 - \beta_1)/5$ and not more than $\beta_2 - (\beta_2 - \beta_1)/5$ and the value of the expression $\alpha^*$ (as defined below and which may be termed the "slot factor" for such a bearing) is made to lie between 0.25 and 50 inclusive.

$\gamma_s$ is the angle subtended by (1) the radius, on which the full circumferential slot, or the row of discrete slots, lies and (ii) the axis of the bearing.

$\beta_1$ is the angle subtended by (i) the radius on which one axial end of the bearing gap lies, and (ii) the axis of the bearing.

$\beta_2$ is the angle subtended, in the same direction as for $\beta_1$, by (i) the radius on which the other axial end of the bearing gap lies, and (ii) the axis of the bearing.

$\alpha^* = (y/r) \cdot (h/z)^3$ for a single row of entry slots
and
$\alpha^* = 2(y/r) \cdot (h/z)^3$ for a double row of entry slots
where
  $y$ = the radial length of the slot
  $r$ = the radius of the sphere
  $h$ = the bearing radial clearance
and
  $z$ = the axial depth of the slot.

With a spherical or part-spherical bearing in accordance with the invention, the advantage is gained that the bearing is not only self-aligning but can be used with any bearing fluid substantially irrespective of the physical properties of the fluid. Thus, with any gas, vapour or liquid (of suitably low viscosity) it is possible to design a bearing of which the load capacity and stiffness are independent of the fluid properties and are dependent only on bearing geometry and the pressure of the supply fluid.

In the particular case of a bearing having hemispherical inner and outer bearing surfaces the maximum axial load capacity is obtained when $\gamma_s$ is ½ ($\beta_1 + \beta_2$).

In the particular case of a symmetrical part-spherical bearing, i.e., in which $\beta_1$ and $\beta_2$ are complementary angles, having a single circumferential slot, or a single row of discrete slots, the maximum radial load capacity is obtained if $\gamma_s$ is 90°.

Although it is possible to design bearing in which $\alpha^*$ lies at the extremes of the range quoted, most useful bearings will have $\alpha^*$ lying within a preferred range of 0.5 to 2.0 inclusive.

It will be known to those skilled in the art of fluid bearings that in a so-called "spherical" or "part-spherical" bearing, the bearing surfaces defining the bearing gap need not necessarily be truly spherical or part-spherical, but may be the shape of other bodies of revolution, e.g., toroidal, provided always that the two surfaces do not vary in contour sufficiently to eliminate the gap altogether; accordingly, the words "spherical" and "part-spherical" as used in this description and in the appended claims are to be construed in that wider sense.

For any geometrically similar series of bearings with equal $\alpha^*$, valves of $C_L$, $C_S$, and $C_F$, independent of fluid properties, can be determined for use in performance formulae similar to the plain journal bearing formulae, viz:

$$W = C_L A (P_o - P_a)$$
$$S = C_S A/h_o (P_o - P_a)$$
$$Q = C_F (h_o)^3 K_F f (P_o)$$

The slots may advantageously be equally angularly spaced about the circumference of that bearing surface in which they are formed.

Experimental work has also shown that both load and stiffness parameters of the slot formation are enhanced if both the entry and the exit ends of the slot have a radius. In the case of the entry to the slot from the plenum chamber, where a sharp edge occurs, the formation of the flow is such as to produce a vena contracta and this effective reduction of the entry increases the pressure drop, thus restricting flow. This may be counterbalanced by radiusing the entry to the slot up to the order of approximately a 10 to 1 ratio, making due allowance for the curvature when calculating slot length per the formula where '$y$' is the effective slot length to be considered.

With regard to the slot exit into the bearing gap, a radius of up to the order of 5 to 1 may advantageously be introduced in order to assist smooth flow transition from the slot into the bearing gap, which is at right angles. Increasing the exit radius beyond about this order may endanger the operation of the bearing by introducing an increased volumetric area which could give rise to the instability commonly referred to as pneumatic hammer when the lubricant is a gas.

The ratios of curvature of entry and exit of the slot are related to the depth of the slot, e.g., the '$z$' parameter as used in the formula, where this parameter is considered as unity when allowing for entry and exit slot radiusing.

In the accompanying drawings:

FIG. 2 is a graph to illustrate the continuing increase of load capacity of a spherical bearing, (FIG. 4), up to the point of touch down;

FIG. 3 is a graph to illustrate negative stiffness effect resulting in the construction of FIG. 4, from selecting an incorrect angular point of entry into the bearing clearance;

Figure 4:
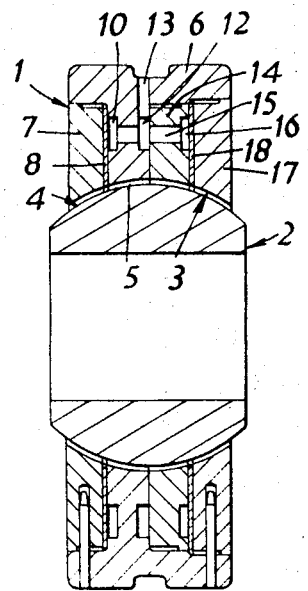
FIG. 4 is an axial section of a part-spherical bearing, in accordance with the invention, having a double row of fluid feed slots.

In the construction shown in FIG. 4, the bearing comprises an outer member 1 and an inner member 2 having respective part-spherical bearing surfaces 3 and 4 which between them define a part-spherical bearing volume 5, usually referred to as the bearing gap.

Figure 1A:
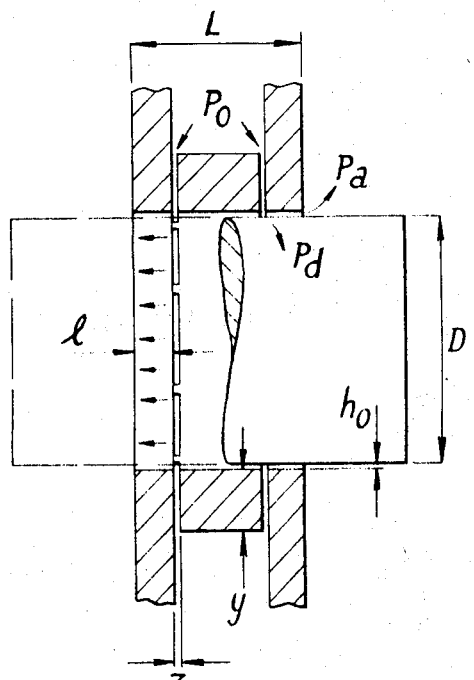
FIG. 1a and 1b are respectively an axial and a radial section through a cylindrical journal bearing to illustrate certain dimensions referred to herein; this bearing is shown for illustrative purposes only, and does not fall within the scope of the invention.
Figure 1B:
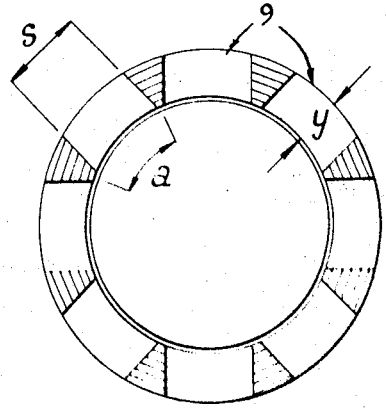

The outer member 1 has a sleeve 6 which receives at one end an annular element 7. Between the sleeve 6 and the element 7 there is clamped a spacer or shim 8 which has lands 8a and spaces 8b (see FIG. 1b) so that when it is clamped in position the sleeve and the element 7 and the shim together define between them a series of slots 9 which are parallel-sided, and equally angularly spaced about the circumference and have their longer dimension arranged circumferentially. The inner end of each slot 9 opens into the bearing gap 5. Each slot 9 is also in communication with an annular plenum chamber 10 fed with fluid, through passages 11 parallel to the axis, from a common annular passage 12. Radial holes 13 serve for feed of fluid to the passage 12. In the sleeve 6 there is provided an annular element 14 having passages 15 and a plenum chamber 16, and another annular element 17 serves to clamp thereagainst a similar shim 18 having slots 9. In this bearing $\beta_1 = 45°$ and $\beta_2 = 135°$ approximately.

Figure 5:
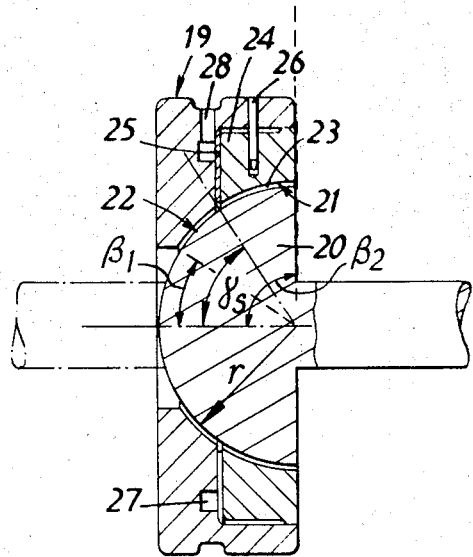
FIG. 5 is an axial section of a hemispherical bearing, in accordance with the invention, having a single row of fluid feed slots.
Figure 6:
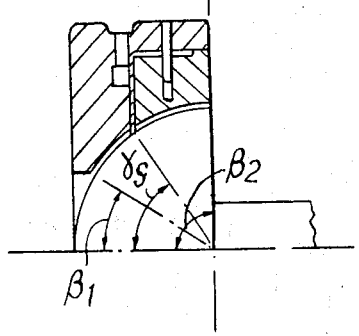
FIG. 6 is an axial section of a part-spherical bearing, in accordance with the invention, having a single row of fluid feed slots.

In one method of construction of a hemispherical bearing, FIG. 5, an outer member 19 and an inner member 20 have respective part-spherical bearing surfaces 21 and 22 which define between them a part-spherical bearing gap 23. An annular element 24 is inserted in the sleeve and serves to clamp therein a spacer or shim 25 as described above. The shim has lands and spaces, and the member 19 and the element 24 and the shim between them define a series of slots 9 opening at their inner end into the bearing gap 23. The element 20 is located and retained in position in the sleeve 19 by one or more taper pins 26. The slots 9 are fed with fluid from an annular plenum chamber 27 which is fed from the exterior through radial passages 28.

In the construction illustrated in FIGS. 4 and 5, the inner member or (in the case of a double row of slots) members is or are located within the sleeve, prior to final assembly. Radial holes are then drilled, for the pins 26, through the main outside diameter of the sleeve and into the inner member or members. Final assembly, when distance pieces or shims are inserted between the sleeve and the annular element or elements, results in slight misalignment of the radial drillings, and a tapered pin 26 is then driven home until flush with the outside diameter of the sleeve, thus locking the assembly together. The pin diameters are preferably calculated such that sheer stresses are at least at a safety factor of 1.5 above maximum working pressure supply to the bearing. In the case of a gas this may be of the order of 200 P.S.I.G. whereas in the case of a vapour (steam) or a liquid this may be as high as 3,000 P.S.I.G.

It is already well known to provide both part-spherical and hemispherical fluid bearings, but hitherto it has not been possible to combine both aerostatic and hydrostatic bearing functions into a single construction as the present invention permits.

Unlike a flat externally pressurized thrust bearing, the axial stiffness of a discrete slot hemispherical bearing does not reduce to zero as the relative members of the bearing approach the contacting or touch down condition. This effect is shown in FIG. 3 by the load coefficient curves maintaining sensibly constant slope as the axial eccentricity ratio increases.

Experimental and calculated results have shown that, in the case of the hemispherical construction of bearing, shown in FIG. 5 the point of entry of the fluid into the bearing gap is of paramount importance. In the particular case of FIG. 5, $\beta_1 = 20$, $\beta_2 = 90$ and $\gamma_s = 55°$, resulting in a hemispherical bearing having stiffness factors superior to that of an equivalent flat thrust plate. In the case of a flat plate, stiffness reduces to zero as the two surfaces approach contact. If, however, the point of entry into the bearing gap is placed at 30° from the bearing axis then as eccentricity increases above about 0.8, a decrease in load capacity occurs and results in negative stiffness, as shown in FIG. 3.

In a hemispherical bearing having a point of entry at about 40° to the bearing axis the load curves are comparable to those of a flat thrust plate bearing, in that stiffness decreases as touch down, between surfaces, is approached, see FIG. 3.

In the case of a spherical bearing, the angular position of the entry slot is measured from a central point normal to the bearing axis, whereas in the case of the hemispherical bearing the entry slot position is measured from the axis of rotation.

Figure 7:
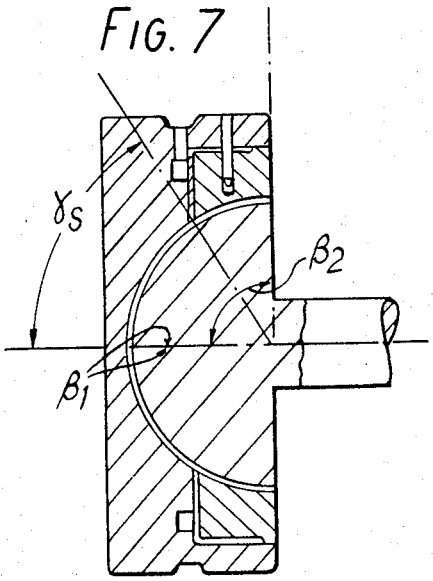
FIG. 7 is an axial section of another form of hemispherical bearing.

Referring to FIG. 7, in which $\beta_1 = 0°$ and $\beta_2 = 90°$, the possible ranges of $\beta_1$ and $\beta_2$ would be as follows:

$\beta_1 \ldots 0° - 180°$ $\beta_2 \ldots 15° - 165°$

The position in general for the slots should be determined from:

$\gamma_s = \frac{1}{2}(\beta_1 + \beta_2)$

Figure 8:
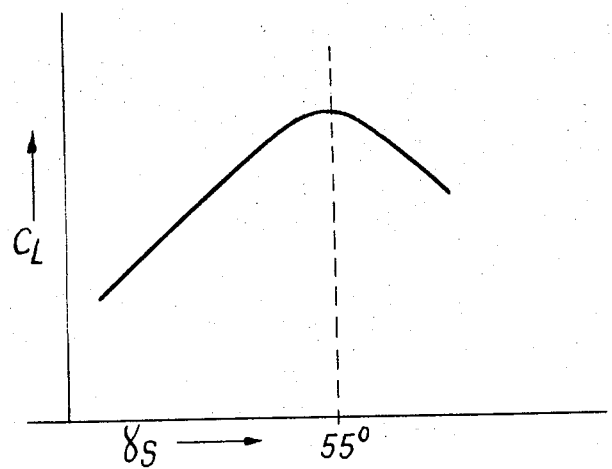
FIG. 8 is a graph to show the relationship between load capacity and the position of the slots in relation to the axis.

Referring to FIG. 8, which is a graph showing the relationship between load capacity $C_L$ and the angular position of the slots relative to the axis ($\gamma_s$), the curve shown is a characteristic curve and is similar for all values of $\beta_1$ and $\beta_2$.

For any series of bearings of equal $\beta_1$, $\beta_2$, $\gamma_s$ and $\alpha^*$, values of $C_L$ and $C_S$ can be determined for loading, parallel to and normal to the geometric axis of symmetry, which are independent of fluid properties.

Further, the slots formula is valid equally for both a discrete slot arrangement and for a full circumferential slot.

I claim:

1. A fluid bearing comprising a first outer bearing member having a part-spherical inner bearing surface, a second inner bearing member having a part-spherical outer bearing surface, said inner and outer bearing surfaces together defining a bearing volume, one of said bearing members including at least one full circumferential slot or circumferential row of discrete parallel-sided fluid entry slots opening into the bearing volume, said discrete slots having their longer cross-sectional dimension disposed circumferentially and the sum of the longer cross-sectional dimension of all of the discrete slots being not less than 80% of the circumference on which they lie, the angle $\gamma_s$ (as defined in the foregoing specification) being not less than $\beta_1 + (\beta_2-\beta_1)/5$ and being not more than $\beta_2 - (\beta_2-\beta_1)/5$ and the value of the expression $\alpha^*$ (as defined in the foregoing specification) being between 0.25 and 50 inclusive.

2. A fluid bearing, as claimed in claim 1, wherein the inner and outer bearing surfaces are hemi-spherical, and wherein $\gamma_s$ is $\frac{1}{2}(\beta_1 + \beta_2)$.

3. A fluid bearing, as claimed in claim 1, wherein there is a single full circumferential slot or row of discrete slots and wherein $\beta_1$ and $\beta_2$ are complementary angles and $\gamma_s$ is 90°.

4. A fluid bearing, as claimed in claim 1, wherein $\alpha^*$ is between 0.5 and 2.0 inclusive.

5. A fluid bearing, as claimed in claim 1, having discrete slots equally angularly spaced about the circumference of that bearing surface in which they are formed.

6. A fluid bearing, as claimed in claim 1, wherein the entry end of the circumferential slot or of the discrete slots is radiused by up to a ratio of 10 to 1.

7. A fluid bearing as claimed in claim 1, wherein the exit end of the circumferential slot or of the discrete slots opening into the bearing volume is radiused by up to a ratio of 5 to 1.

* * * * *